INVENTOR
LARRY R. SWANEY 3,485,586
**PREPARATION OF SUBMICRON
TITANIUM CARBIDE**
Larry R. Swaney, Barberton, Ohio, assignor to PPG Industries, Inc., Pittsburgh, Pa., a corporation of Pennsylvania
Continuation-in-part of application Ser. No. 643,818, June 6, 1967. This application Sept. 26, 1968, Ser. No. 762,821
Int. Cl. C01b 31/30
U.S. Cl. 23—208                          12 Claims

ABSTRACT OF THE DISCLOSURE

Titanium carbide, usually in finely divided particulate form and often predominantly (both on a weight and a numerical basis) in the form of small cubic crystals in a particle size range of 0.04 to 0.25 micron and a mean numerical particle size of 0.04–0.1, is formed by reacting a titanium halide in vapor state with perchloroethylene or like compound of carbon and halogen, or carbon, halogen and hydrogen, at a carbide forming temperature. The process is generally conducted in the presence of hydrogen which is at carbide forming temperatures generated by passing the hydrogen through an electric arc, with the titanium chloride or like halide and the compound of chlorine and carbon, or chlorine, hydrogen and carbon, being fed into the hot hydrogen stream thus produced.

Description of the invention

Figure 1:
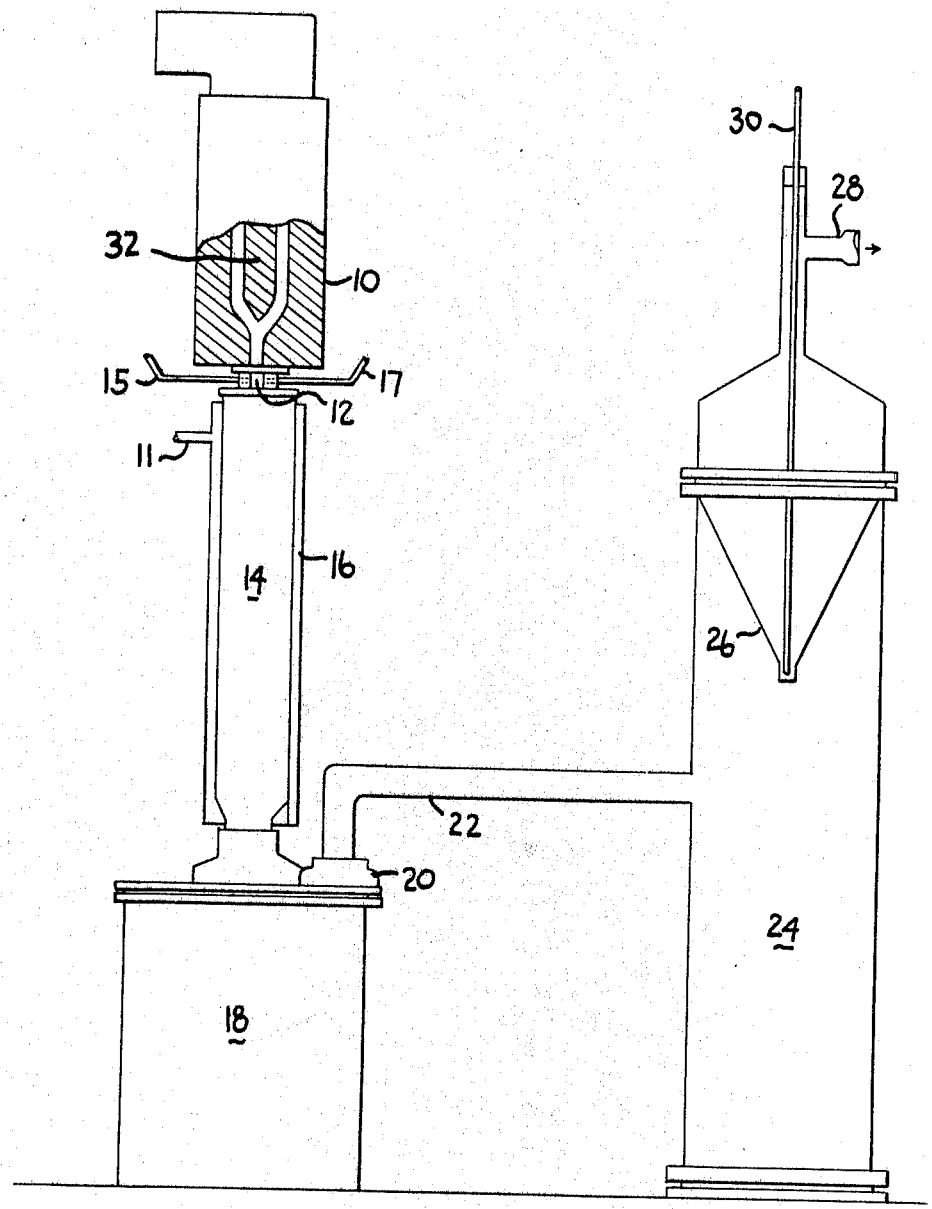

This application is a continuation-in-part of copending application for United States Letters Patent, Ser. No. 643,818, filed June 6, 1967. The invention involved here is directed to a novel method of producing titanium carbide and to the novel titanium carbide thus produced.

It is known that titanium carbide may be produced by reacting methane with a titanium halide, such as titanium tetrachloride, at a high temperature. Temperatures usually used for the production of such carbides are normally above 1500° C., usually ranging from about 2000° C. to about 4000° C. or above (even as high as 15,000° C.). Such temperatures (which may be termed "carbide forming temperatures") may be generated by an electric discharge or ion plasma which may be established by an arc directly between two electrodes at different electric potential or by an induction plasma.

In a convenient method of producing titanium carbide in this way, hydrogen has been allowed to pass through an electric arc, such as that developed in the so-called "plasma arcs," with the result that the temperature of the hydrogen is raised to a very high temperature well above 1500° C., and usually in the range of 2000 to 4000° C. and flows outwardly from the zone in the form of a luminescent gas stream or flame. The titanium tetrachloride and hydrocarbon are then injected into the hot hydrogen stream or flame or at least into the environment thereof.

In the performance of this process, some carbon as well as titanium carbide is produced. Furthermore, within a short period of time after commencement of such a process, the gas conduits of the equipment in which the process is conducted rapidly tend to build up deposits on their walls or ports therein to such an extent that the equipment must be shut down for cleaning. The deposits which thus form are composed largely of titanium carbide which is in a dense massive (as distinguished from a light particulate) form which is tightly bonded to the walls of the apparatus, particularly those walls close to the flame of the arc. Crystalline or carbonaceous deposits are tightly sintered or otherwise bonded together and to the equipment walls, forming a more or less continuous coating on the walls, for example, of the gas ports. This is in contrast to the loose, finely divided particles which often tend to accumulate as a dust or cluster of particles on other walls of the equipment downstream of the arc flame. Such loose deposits can be brushed off readily and have a particle size substantially the same as that of titanium carbide formed and swept through the system suspended in the reaction product gases.

According to the present invention, it has been found that the formation of these dense, nonparticulate deposits can be substantially suppressed, reduced or even effectively eliminated by reacting a halide of titanium, such as titanium tetrachloride, with a compound of halogen and carbon, which term of course includes compounds of halogen, hydrogen and carbon. Thus, it has been found that titanium carbide can be produced in high yields by reacting together titanium tetrahalide and perchloroethylene in contact with a hot stream of gas (preferably hydrogen) which has been heated by passing through a plasma arc. Substantially less so-called "burner growth" or massive or sintered titanium carbide (TiC) and less plugging of the ports emitting the reaction gases to the hydrogen flame is observed when perchloroethylene is used in lieu of all or a part of the methane.

Figure 2:
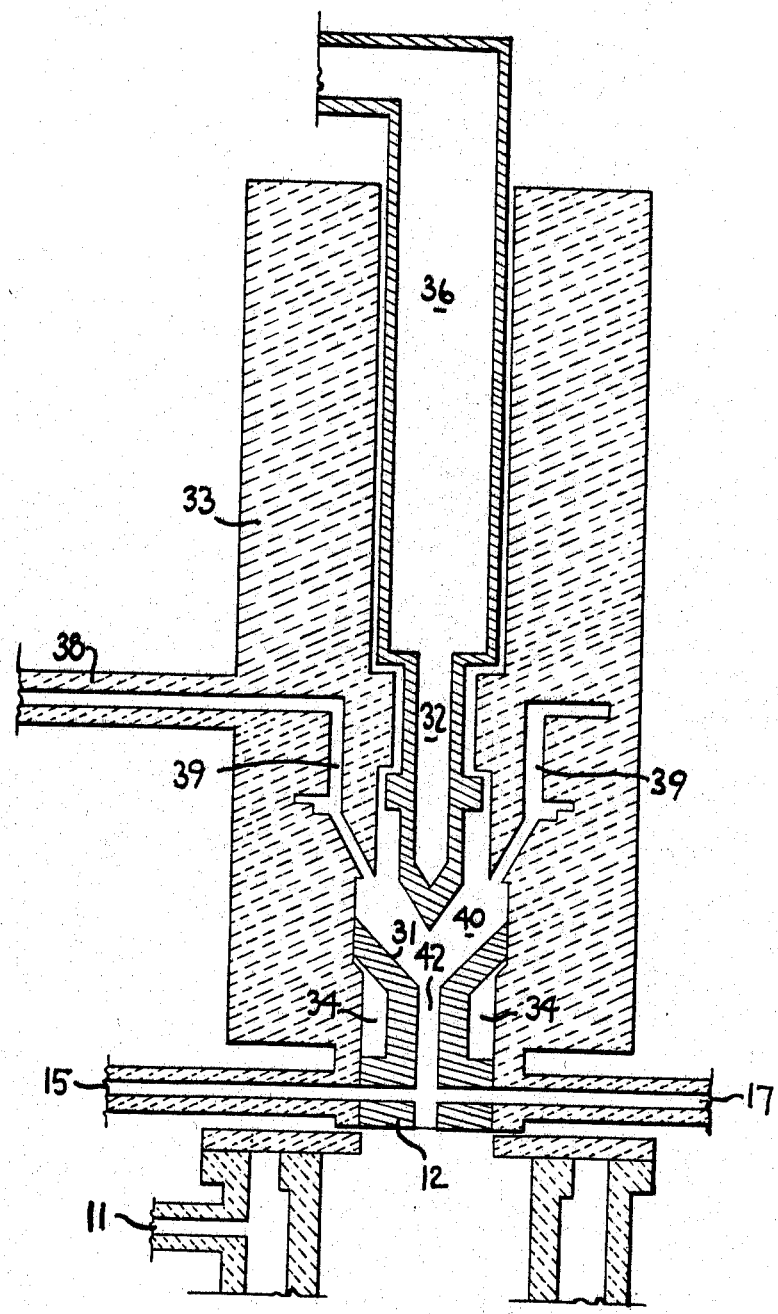

The process may be conducted using any convenient type of plasma arc gas heater or flame generator. Typical equipment which may be used in the practice of this invention is diagrammatically illustrated in the accompanying drawings in which:

FIG. 1 is a diagram of an assemblage, partially broken away in section, comprising the gas heating system or plasma arc gun, the reactor, and auxiliary equipment for the recovering of the resulting titanium carbide; and FIG. 2 is a diagrammatic sectional view of a typical plasma gun capable of use in the practice of this invention.

As shown in FIG. 1, the apparatus comprises a plasma gun or torch 10 capable of projecting a downwardly directed flame (not shown). This flame projects into a tube 12 which connects at its lower end with a tube or chamber 14 which is enclosed in gas tight, water cooled jacket 16. The tubular chamber extends downwardly and exits into a settling chamber 18 which has an outlet 20 at the top thereof to convey exit gases to a conduit 22 and thence to a gas separation chamber 24 in which there is disposed a bag filter 26, electrostatic precipitator or other convenient means for separating suspended solids from a gas. The separation chamber 24 also has an exit or exhaust 28 at its upper portion on the opposite side of the bag filter. As shown, the bag filter has engaged therewith a suitable shaking means 30.

The walls of tube 14 are porous, for example, being composed of porous graphite or other porous inert material through which gas is inert to TiC may be led in order to suppress or prevent accumulation of the pulverulent TiC powder on the tube walls. Suitable gases for this purpose include noble gases, such as argon, or other non-reactive gases, such as hydrogen. This gas is introduced through inlet 11 into the jacket 16 and then flows through the tube walls into the interior of tubular chamber 14.

As illustrated in FIG. 2, the plasma gun consists essentially of an annular anode nozzle 31 which is aligned axially with a cathode rod 32 which is mounted in a refractory cylindrical base 33 which is electrically non-conductive and which encloses the cathode rod. In the embodiment illustrated, the cathode rod tapers conically at its end essentially to a point.

As is conventional with such guns, the anode is enclosed by a cooling chamber 34 through which water or other cooling medium may be circulated by means not shown in order to hold the anode at a suitable low temperature and prevent undue corrosion thereof. In a similar manner the interior of the cathode is provided with a cooling chamber 36 with means (not shown) to circulate water or cooling fluid therein in order to hold the cathode at a suitable temperature. The anode and cathode are spaced longitudinally as indicated in the drawing to provide an annular space 40 which tapers conically to the axial outlet conduit 42. An electric arc is struck between the cathode and the anode by establishing a proper voltage therebetween. The assemblage is also provided with a gas inlet 38 which communicates through an annular, conical conduit 39 with the gas space 40 to supply the gas (hydrogen) to be heated in or by the arc.

In the operation of the device illustrated, a gas such as hydrogen to be heated is fed into passage 40 through inlet 38. Cooling medium is circulated through the anode and cathode cooling chambers 34 and 36 to hold the temperature of the electrodes low enough to minimize corrosion or erosion thereof and an electric potential is set up between the anode and cathode to cause the arc to be struck and maintained. Gas flow is continued through inlet tube 38 and, as a consequence of the arc, the gas reaches a high temperature and escapes through the tube 42 in the anode, producing a rapidly flowing, glowing stream or flame of the hot gas. This flame projects downwardly through the central area of tube 12 extending even into chamber 14. Perchloroethylene vapor or the like is projected through a slot or port in the tube communicating with supply tube 15, while a mixture of titanium tetrachloride and hydrogen is projected through another port or slot in tube 17. These tubes each extend through the wall of tube 12 and are directed radially toward the center area in which the flame of hot gas is caused to flow and terminate in the above mentioned ports in such wall. As a general rule, these ports are on opposite sides of the tube a distance of 180° to 120° from each other, although they may be otherwise located. If desired, the tubes may be directed downwardly at an angle to the vertical toward the exit of tube 12 so that gas flow may be directed at such angle into or in contact with the flame or hot gas.

The resulting gaseous mixture is then swept into the interior of reactor tube 14 with the resulting flame being downwardly directed and extending a substantial distance, for example, 2–6 inches into the interior of the tube 14.

The gas suspension of titanium carbide and hydrogen chloride thus obtained flows downwardly with the gas circulated through the arc into chamber 18. This suspension or reaction mixture is cooled in the reactor and the chamber as it passes through chambers 14 and 18 so that the reaction mixture is rapidly quenched to a low temperature at which little or no oxidation or reversion of the reaction can take place. Thus, cooling of the gas of the mixture to below 750° C. takes place usually in less than one second and in any event less than 10 seconds after the gas leaves the plasma flame.

The resulting gas suspension, after being cooled in chambers 14 and 18, passes through conduit 22 into a separation chamber where the gases are passed through the bag filter 26. Exit gases are then withdrawn from outlet 28. Periodically, the bag filter is shaken to loosen deposits thereon by movement of the shaker stick 30. The separated titanium carbide settles or falls and is collected in the bottom of chamber 24.

As a general rule, hydrogen is used as the gas to be heated by the plasma arc. This is advantageous since it insures the establishment of a reducing atmosphere and serves as a chlorine acceptor, removing the chlorine from the titanium tetrachloride and the chlorine-carbon compound used as hydrogen chloride. When the hydrogen is so used, it is important to use anodes which are capable of withstanding the erosion and/or corrosion of the system. Anodes having an exposed surface predominantly composed of molybdenum metal are very effective.

The amount of hydrogen introduced into the reaction zone, when the titanium halide ued is titanium tetrachloride, should be in substantial excess of the theoretical amount of hydrogen required for the equation:

$$n\text{TiCl}_4 + \text{C}_n\text{H}_m\text{Cl}_x + (2n + \tfrac{1}{2}x - \tfrac{1}{2}m)\,\text{H}_2 \rightarrow n\text{TiC} + (4n+x)\,\text{HCl}$$

where $n$ reflects the number of carbon atoms,
$m$ reflects the number of hydrogen atoms, and
$x$ reflects the number of chlorine atoms in the compound of chlorine and carbon used. Similarly, when other halides are used, the amount of elemental hydrogen should be well in excess of the chemical equivalent of the halogen of the titanium halide.

Often the amount of hydrogen introduced will be in excess of ten times and as high as 100 times the amount of hydrogen shown to be required by the above equation or required to equal the chemical equivalents of halogen of the titanium halide.

Various volatile compounds of chlorine and carbon may be used. These include methyl chloride, chloroform, methylene chloride, carbon tetrachloride, amyl chloride, vinyl chloride, 1,1-dichloroethylene, 1,2-dichloroethylene, 1,1-dichloroethane, 1,2-ethylene dichloride, trichloroethylene, perchloroethylene, propylene dichloride, 1,1,2-trichloroethane, 1,1,1-trichloroethane, and like aliphatic chlorides, fluorides, bromides or iodides containing up to about 6 or 8 carbon atoms. Aromatic chlorocarbon compounds also may be used including monochlorobenzene, orthodichlorobenzene, paradichlorobenzene and the like, as well as cycloaliphatic chlorides, such as chlorinated cyclopentadiene, cyclohexylchloride, etc. As a general rule, the halo derivatives should be readily vaporizable without tar formation since otherwise unnecessary difficulties which are unrelated to the process itself can arise through the plugging of lines by the decomposition and/or polymerization products in the course of vaporizing the product. Of course, the corresponding iodides and bromides and fluorides of the above components can be used in the same way. Thus, dichloro difluoro methane or ethylene dibromide may be used in lieu of ethylene dichloride in Example 1 described below.

The amount of chlorine or like halogen compound usually is at least 20 percent and often 50 to 300 percent in excess of the amount required by the above equation.

According to a further embodiment of the invention, a mixture of hydrocarbon and one of the above compounds of halogen and carbon may be introduced into the reaction zone. For example, various volatile hydrocarbons containing up to about 8 or even 12 carbon atoms, such as methane, ethane, propane, n-butane, isobutane, pentane, benzene, gasoline, kerosene, cresol, naphtha naphthalene, etc., may be fed into the reaction tube 12 with ethylene dichloride or the like. As a general rule, the ethylene dichloride or like compound of hydrogen, chlorine and carbon (or chlorine and carbon) should be at least about 5 percent, preferably more than 20–30%, of the total carbon compounds fed to the reaction zone. In the case of such mixtures, they are used in amounts sufficient to supply carbon in excess of the theoretical amount required as indicated above in the equations and related discussion rarely below 20 percent in excess and more often 50–300 percent in excess of such theoretical amount.

The following examples are illustrative volumes of gas being expressed in cubic centimeters as volumes at 760 millimeters of mercury pressure and 0° C. and expressed in cubic feet as volumes at 14.7 pounds pressure and 70° F.

Example 1

The device used was subtantially as diagrammatically illustrated in FIGS. 1 and 2 hereof. Spacing between the electrodes in the conical passage 40 was about 1/16 inch, the diameter of axial conduit 42 was 1/8 inch and its length 3/8 inch. The diameter of tube 12 was 1/8 inch and of tube 14 was 1¼ inches.

Hydrogen was bubbled through liquid titanium tetrachloride having a temperature of 55° C. to produce a hydrogen-TiCl₄ stream which was introduced through tube and port 17 into tube 12 at a rate of 2.09 grams of TiCl$_4$ and 4.3 liters of hydrogen per minute. At the same time a mixture of hydrogen and 1,2-ethylene dichloride at a rate of 4.3 liters of hydrogen and 0.8 gram of ethylene dichloride per minute was fed into tube 12 through conduit and port 15. These two conduits were horizontally directed and radially directed toward the axis of tube 12 and spaced 180° from each other.

Hydrogen was fed at the rate of 20 liters per minute into the plasma gun at inlet 38. The current flow between the electrodes was 80 amperes at 90 volts. The titanium tetrachloride-hydrogen mixture and the hydrogen-ethylene dichloride mixture thus was directed in the tube 12 toward the downwardly directed flame of the plasma gun. The gaseous mixture was quenched to below 300° C. in less than one second.

This process was continued for 25 minutes. While a small amount of TiC deposit had formed on the walls of the tube 12, the port 15 and 17 were open and the run could have been continued. In contrast, when methane is used in lieu of ethylene dichloride the equipment becomes so plugged after 15 to 20 minutes that it has to be shut down. The deposits in such a run completely plug ports 15 and 17. While some loose deposit was formed on the tube 12 with ethylene dichloride, it was less than when methane was used.

Yield of TiC was 98.2 percent of theory based on TiCl$_4$ when ethylene dichloride was used, whereas a lower yield was obtained with methane.

The product was a finely divided, fluffy, black powder of cubic crystals having a particle size range of 0.02–0.35 micron. The predominant particle size range was 0.04–0.25 micron. The means numerical particle size was about 0.06 micron. The particle size distribution was as follows:

99% of the particles were below 0.2 micron
60% of the particles were larger than 0.04 micron
45% of the particles were larger than 0.05 micron
80% of the particles were larger than 0.03 micron
99% of the particles were larger than 0.02 micron In the above process the jacket 16 which was 2 inches in diameter was provided with a liner 14 of porous graphite having an outside diameter of 1⅝ inches, an inside diameter of 1¼ inches, and a length of 7⅛ inches. Hydrogen at room temperature was fed through the liner walls at a rate of 35 liters per minute. This gas was fed tangentially into the annular space within jacket 16 enclosing the tube and diffused through the porous graphite.

Example 2

The process of Example 1 was repeated except that perchloroethylene was used in lieu of ethylene dichloride and the rate of flow of TiCl$_4$ was 2.07 grams per minute and perchloroethylene was 1.72 grams per minute. Titanium carbide of the same particle size was produced and no plugging took place over a period of 25 minutes from the time the run started to produce titanium carbide. The yield was at least 93% of theoretical.

Example 3

The process of Example 1 was repeated with the same equipment and the same power input using vinyl chloride in lieu of ethylene dichloride. The other conditions were as follows:

Feed to inlet tube 38—20 liters hydrogen per minute;
Feed to inlet tube 17—4.3 liters hydrogen per minute, 2.15 grams of TiCl$_4$ per minute;
Feed through porous wall—35 liters hydrogen per minute;
Feed to inlet tube 15—4.3 liters hydrogen per minute, 270 cubic centimeters of vinyl chloride per minute.

A 99 percent yield of TiC of the same particle size was obtained.

The process may be conducted in the same way with other compounds of chlorine and carbon such as mentioned above. Compounds containing but one carbon atom, such as carbon tetrachloride, may require more electric power input in order to maintain adequate reaction temperature and to obtain complete reaction.

It is to be understood that in addition to the halogen-carbon compounds mentioned above which consist entirely of carbon and halogen, or carbon, halogen and hydrogen, compounds which contain carbon, halogen and an additional element other than hydrogen may be used in lieu of ethylene dichloride in the above examples so long as the additional element does not unduly contaminate or affect the titanium carbide or produce undesirable side reactions. For example, phosgene may be used in lieu of all or part of the ethylene dichloride of Example 1. However, some contamination of the titanium carbide with oxide, either as titanium oxide or oxycarbide, may result. Likewise chloral, trichloroacetic acid, orthodichlorophenol and metachloronitrophenol may be substituted for a portion or all of such ethylene dichloride to produce titanium carbide.

As a general rule, however, it is preferred to avoid the presence of compounds which contain elements other than halogen, carbon and hydrogen because of the difficulty in obtaining high purity titanium carbide when other atoms are present.

The TiC which is thus produced by this invention is a powder in the form of small black cubic crystals.

It will be noted that the mean numerical particle size of these products was about 0.06 micron and most of the particles were in the range of 0.04 to 0.25 micron. This is an advantageous particle size range since it is neither too large nor too small. TiC in larger particle size range, e.g., 1–4 micron, must be milled for many hours in order to provide a product which may be usefully dispersed in tool faces of cutting tools. The smaller particle size range of the product produced according to the present invention permits a more thorough distribution of the TiC in tool face material, such as cobalt or nickel, for cutting tools, dies, and the like. Furthermore, the relatively narrow range of these small particle sizes permits more ready use of these materials as effective polishing powders, abrasive polishers, pigments, or on sandpapers.

At the same time, the TiC produced according to this invention is not excessively small. This is important since products which are predominantly lower in particle size than 0.03 micron are so small that they cannot effectively be used in polishing or cutting tools or related operations to gain optimum advantage of the intrinsic hardness of TiC.

Control of the particle size may be effected by control of the amount of gas which is allowed to enter the reaction zone and/or the quench zone following the reaction zone. Thus, in the examples, by increasing the amount of hydrogen fed through the porous wall from 35 liters to 45 liters per minute, the particle size falls by about one-half. Upon decreasing the amount to 25 liters per minute, the particle size further coarsens within the desired range herein contemplated. This increase or decrease thus changes operating conditions of the quench zone, such as rate of quench, degree of gas dilution, residence time in quench zone, velocity and turbulence of gas flow, etc. A similar result is achieved if the volume of hydrogen flow into the plasma gun is increased.

The particle size increases as the rate of introduction of reactants TiCl$_4$ and carbon compound are increased. If the power is increased with other conditions held constant, the product becomes finer and vice versa.

The advantageous properties herein sought are attained when the preponderant number of crystals of TiC produced according to this invention have a size of 0.04 to 0.25 micron.

In practice, the particle size control can be achieved by periodically observing the size of the product coming from the reactor and adjusting the conditions as described above to increase the particle size where the observed sample is found to be too small and to decrease such size when it becomes too large, or to make compensating adjustments as the size increases or decreases within the desired range.

These advantageous properties may also be obtained using hydrocarbons in lieu of the carbon-chlorine compounds mentioned above, provided proper operating conditions are maintained, although with the plugging deposits which have been described. Methane is preferred for this purpose, but other hydrocarbons can be used. Such hydrocarbons include the normally gaseous or liquid but relatively volatile hydrocarbons, including saturated hydrocarbons such as methane, ethane, propane, and the butanes, the pentanes, cyclopentane, cyclohexane, toluene, benzene, etc.; the unsaturated hydrocarbons such as ethylene, propylene, isopropylene, symmetrical dimethyl ethylene and like alkenes; acetylenic compounds of which may be noted acetylene, methyl acetylene, ethyl acetylene and dimethyl acetylene. These hydrocarbons while useful are generally more expensive and hence not in the preferred status of methane. Rarely are hydrocarbons of more than 12 carbons used.

Typical examples are as follows:

Example 4

In this example, apparatus for generating the hydrogen plasma was a DC arc plasma having its arc plasma torch altached electrically to a 14-kilowatt DC power supply. The torch has a water cooled tungsten cathode and a molybdenum anode.

From the torch, the hydrogen plasma generated from feeding elemental gaseous hydrogen at 23 to 24 liters per minute (standard conditions) to the arc established between the anode and cathode of the torch while operating the power source at the level of 7.2 kilowatts was forwarded downwardly through a water cooled metal tube approximately 9 inches long lined with carbon to provide a zone of 1.5 inches internal diameter. Gaseous methane at the rate of 350 cubic centimeters per minute (standard conditions) and gaseous titanium tetrachloride at the rate of 1.2 grams per minute were fed separately and from oppositely disposed injection tubes located in a short tube adjacent the anode orifice of the torch connecting the torch and the metal reactor tube into the hydrogen plasma as it passed downwardly therethrough to the metal tube. The gas stream emanating from the reactor tube was forwarded to and upwardly through a Teflon dust bag collector located in a 4-inch diameter Pyrex tube. Titanium carbide of high blackness was produced with a particle size range of from 0.04 to 0.16 micron.

Alternatively to this specific mode, the methane may be premixed with the hydrogen and the two passed through the electric arc in this type of plasma torch. It is also feasible to add the methane and titanium halide sequentially to the hydrogen plasma.

To produce the novel submicron titanium carbide compositions of this invention, any of a wide variety of techniques and apparatus serve effectively to generate the requisite hydrogen plasma. In lieu of the DC arc plasma described in Example 4, other apparatus such as induction type plasma perform the present invention, as the ensuing example illustrates.

Example 5

In the runs of this example, the apparatus comprised a high frequency plasma generator consisting of a water cooled quartz tube surrounded by an inductor coil and a high frequency power supply capable of putting out a controlled high frequency power. The torch design of the plasma generator confined the plasma to the zone within the water cooled quartz tube. In the operation of this induction plasma, the gases from which the plasma is to be generated (here, argon and hydrogen) were injected in a controlled pattern at the rear of the tube. Plasma generation was induced by high temperature ionization of the metallic gold coating applied to the inner walls of the quartz tube.

Connected to the plasma generating apparatus was a 3-inch internal diameter copper tube approximately 2 feet long. A circular water cooling spray positioned approximately 2 to 3 inches below the coupling of this tube with the plasma generating apparatus served to cool the products. A U-shaped tubing of the same size attached to the lower portion of the vertical copper tube was immersed in a water cooling bath. The other leg of this U-shaped copper tube was attached at its upper end to a collection system provided by a Teflon bag through which the gases were passed and the titanium carbide separated.

Using the above described equipment under varying conditions, methane and argon (in amounts indicated in the table) were introduced through a central feed port into the quartz tube of the torch. Except for the first run in which hydrogen was the carrier gas for the titanium tetrachloride feed, argon was the carrier gas for the titanium tetrachloride. Feed of the titanium tetrachloride and carrier gas was accomplished by injecting vaporized titanium tetrachloride along with carrier gas as a gaseous mixture at a temperature of 40° C. to 70° C. into the quartz tube through opposing radial ports in the torch head. Hydrogen and the balance of the argon used in the runs were fed as a gaseous mixture through the tangential gas feed holes provided in the apparatus. This tangential feed creates a vortex which causes backmixing of plasma.

This apparatus and procedure were followed (with conditions varied as specified in the following table) to provide submicron, extremely black titanium carbide compositions of the character denoted in the table.

| Run No. | TiCl₄ Rate, grams/ minute | Power Input, kw. | Feed Rates | | | | | TiC Particle Size, microns |
|---|---|---|---|---|---|---|---|---|
| | | | CH₄, cu. cm. per min. | H₂, cu. ft. per hr. | Argon | | | |
| | | | | | Central | Tangential | Radial | |
| 1 | 0.9 | 32 | 300 | *59.3 | 48 | 86 | | 0.01–0.05 |
| 2 | 1.6 | 36 | 291 | 39.7 | 38 | 80.6 | 9.1 | 0.03–0.02 |
| 3 | 2.96 | 37 | 580 | 39.7 | 38 | 76.8 | 13.6 | 0.06–0.18 |
| 4 | 4.22 | 38 | 800 | 39.7 | 38 | 76.8 | 13.6 | 0.06–0.25 |
| 5 | 7.3 | 39 | 1,250 | 39.7 | 38 | 76.8 | 19.8 | 0.08–0.25 |

*16.5 standard cubic feet/hour of this as carrier gas.

Yields of titanium carbide based upon titanium tetrachloride feed ranged from 90 percent in Run 5 to nearly 98 percent in Run 2.

As comparison of Runs 1 to 5 shows, the greater the power (per unit of product) supplied to the torch, the finer the product's particle size.

Slurries of these submicron titanium carbides containing 5 grams of titanium carbide per 100 cubic centimeters of water at room temperature had a pH of between 2.5 and 3. They possessed a slight positive charge and under electron microscope examination appeared to be primarily of cubic crystal structure.

The more finely divided titanium carbide of Run 1 was even blacker than Run 5 products, indicating a relationship between fineness of particle size and blackness.

A sample of the submicron titanium carbide produced in Run 1 of Example 5 was evaluated both on an equal volume basis and an equal weight basis by comparison with lampblack (a standard lampblack used in gray tints, obtained from Central Scientific Company) according to the test method entitled "Mass Color and Tinting Strength of Colored Pigments" bearing the A.S.T.M. designation D-387-60. This evaluation showed the titanium carbide to be a markedly more efficient light absorber than the lampblack on both a weight and a volume basis.

The finely divided submicron titanium carbides produced in the foregoing example are pigmentary in character and useful as the black pigmenting agent in black paints. Their quality of jetness makes them especially appealing. By comparison with Soya alkyl paint systems relying on high grade lampblack as the black pigmenting agent, use of these titanium carbide products provides paint systems having noticeably less transmittance reflectance in the visible light wavelengths, denoting their superiority as black pigments. Submicron titanium carbide of the present invention is useful in lieu of or in conjunction with high grade lampblack carbons (or like black pigments) in the formulation of paints or films, tires and other rubber goods, and other compositions in which blackness (light absorption), especially jetness, is desired.

It is to be understood that the above described process can be used for the production of titanium carbide by using other titanium halides, such as titanium dichloride or titanium trichloride, in lieu of all or a portion of the titanium tetrachloride. In the same way, the corresponding bromides, iodides and chlorides, such as titanium tetrabromide or titanium tetrafluoride, may be used in lieu of titanium tetrachloride.

Although the present invention has been described with reference to specific details of certain embodiments thereof, it is not intended that such details shall be regarded as limitations upon the scope of the invention except as and to the extent they are included in the accompanying claims.

What is claimed is:

1. A method of preparing titanium carbide which comprises passing hydrogen through a plasma and thereby producing a hot flowing stream of hydrogen and introducing into the flowing hydrogen stream titanium halide in vapor state and a volatile compound from the group consisting of compounds of halogen and carbon and compounds of halogen, hydrogen and carbon thereby producing a suspension of titanium carbide particles in the hydrogen stream, removing the titanium carbide suspension from the zone where it is formed, and recovering the resultant titanium carbide while it remains in particulate form from the suspension.

2. The process of claim 1 wherein the resulting suspension is quenched to below 300° C. in less than 10 seconds after the hydrogen leaves the plasma.

3. The process of claim 2 wherein the titanium carbide is cooled below 300° C. while it is in the particle size range of 0.04 to 0.25 micron.

4. The process of claim 1 wherein the suspension is fed into a chamber having porous walls and hydrogen is diffused through said walls to minimize accretion of titanium carbide thereon.

5. The process of claim 1 wherein the resulting suspension is quenched to below 300° C. in less than one second after the hydrogen leaves the plasma.

6. The process of claim 1 in which the compound is a compound of halogen, hydrogen and carbon.

7. The process of claim 1 in which the halogen of the compound is chlorine.

8. The process of claim 1 wherein the compound is ethylene dichloride.

9. The process of claim 1 wherein the compound is vinyl chloride.

10. The process of claim 1 wherein the compound is trichloroethane.

11. The process of claim 1 wherein the compound is a perchloroethylene.

12. The process of claim 1 wherein the compound is a chloroethylene.

References Cited

UNITED STATES PATENTS

| 2,532,295 | 12/1950 | Gardner. |
| 3,253,886 | 5/1966 | Lamprey et al. |
| 3,340,020 | 9/1967 | Neuenschwander et al. |

FOREIGN PATENTS

| 988,097 | 4/1965 | Great Britain. |

OTHER REFERENCES

The Merck Index: 7th Edn., p. 1094.

OSCAR R. VERTIZ, Primary Examiner

G. T. OZAKI, Assistant Examiner

U.S. Cl. X.R.

106—228, 261; 204—164